(12) United States Patent
Mulloy et al.

(10) Patent No.: US 8,653,410 B2
(45) Date of Patent: Feb. 18, 2014

(54) METHOD OF FORMING SUBSTRATE FOR FLUID EJECTION DEVICE

(75) Inventors: Michael Mulloy, Stillorgan (IE); Graeme Scott, Maynooth (IE)

(73) Assignee: Hewlett-Packard Development Company, L.P., Houston, TX (US)

( * ) Notice: Subject to any disclaimer, the term of this patent is extended or adjusted under 35 U.S.C. 154(b) by 2848 days.

(21) Appl. No.: 11/262,068

(22) Filed: Oct. 28, 2005

(65) Prior Publication Data

US 2006/0049156 A1 Mar. 9, 2006

Related U.S. Application Data

(63) Continuation-in-part of application No. 10/076,467, filed on Feb. 15, 2002, now abandoned.

(51) Int. Cl.
*B23K 26/38* (2006.01)

(52) U.S. Cl.
USPC ............................................... 219/121.71

(58) Field of Classification Search
USPC ............ 219/121.61, 121.71, 121.7, 121.76, 219/121.78, 121.84, 121.85; 216/27
See application file for complete search history.

(56) References Cited

U.S. PATENT DOCUMENTS

| | | |
|---|---|---|
| 2,841,477 A | 7/1958 | Hall |
| 3,364,087 A | 1/1968 | Solomon et al. |
| 3,571,555 A | 3/1971 | Townes et al. |
| 3,866,398 A | 2/1975 | Vernon, Jr. et al. |
| 4,260,649 A | 4/1981 | Dension et al. |
| 4,331,504 A | 5/1982 | Chuang et al. |
| 4,332,999 A | 6/1982 | Wittke |
| 4,467,168 A | 8/1984 | Morgan et al. |
| 4,532,401 A | 7/1985 | Shiozaki et al. |
| 4,643,799 A | 2/1987 | Tsujii et al. |
| 4,719,477 A | 1/1988 | Hess |
| 4,731,158 A | 3/1988 | Brannon |
| 4,746,935 A | 5/1988 | Allen |
| 4,801,352 A | 1/1989 | Piwczyk |
| 4,913,405 A | 4/1990 | Van Der Have et al. |
| 4,915,981 A | 4/1990 | Traskos et al. |
| 4,925,523 A | 5/1990 | Braren et al. |
| 5,093,548 A | 3/1992 | Schmidt-Hebbel |
| 5,105,588 A | 4/1992 | Verley et al. |
| 5,164,324 A | 11/1992 | Russell et al. |
| 5,211,806 A | 5/1993 | Wong et al. |

(Continued)

FOREIGN PATENT DOCUMENTS

| | | |
|---|---|---|
| EP | 0525497 | 2/1993 |
| EP | 0599595 | 6/1994 |

(Continued)

OTHER PUBLICATIONS

Japanese Unexamined Patent Application, (Kokai) No. Sho 63-13334, Application No. 61-156100, Filing Date Jul. 4, 1986. Hitachi, Ltd. "Dry Etching Technique," Pub. Jan. 20, 1988.

(Continued)

*Primary Examiner* — Brian Jennison

(57) ABSTRACT

A method of forming an opening through a substrate having a first side and a second side opposite the first side includes laser machining a first portion of the opening into the substrate from the second side toward the first side, and abrasive machining a second portion of the opening into the substrate. Abrasive machining the second portion of the opening into the substrate includes completing the opening through the substrate.

35 Claims, 9 Drawing Sheets

(56) References Cited

U.S. PATENT DOCUMENTS

| | | | |
|---|---|---|---|
| 5,266,532 A | 11/1993 | Russell et al. | |
| 5,317,346 A | 5/1994 | Garcia | |
| 5,322,988 A | 6/1994 | Russell et al. | |
| 5,345,057 A | 9/1994 | Muller | |
| 5,348,609 A | 9/1994 | Russell et al. | |
| 5,354,420 A | 10/1994 | Russell et al. | |
| 5,362,450 A | 11/1994 | Russell et al. | |
| 5,385,633 A | 1/1995 | Russell et al. | |
| 5,387,314 A | 2/1995 | Baughman et al. | |
| 5,441,593 A | 8/1995 | Baughman et al. | |
| 5,443,033 A | 8/1995 | Nishizawa et al. | |
| 5,451,378 A | 9/1995 | Russell et al. | |
| 5,469,199 A | 11/1995 | Allen et al. | |
| 5,493,445 A | 2/1996 | Sexton et al. | |
| 5,501,893 A | 3/1996 | Laermer et al. | |
| 5,504,301 A | 4/1996 | Eveland | |
| 5,531,634 A | 7/1996 | Schott | |
| 5,531,857 A | 7/1996 | Engelsberg et al. | |
| 5,591,285 A | 1/1997 | Afzali-Ardakani | |
| 5,608,436 A | 3/1997 | Baughman et al. | |
| 5,643,472 A | 7/1997 | Englesberg et al. | |
| 5,658,471 A | 8/1997 | Murthy et al. | |
| 5,669,979 A | 9/1997 | Elliott et al. | |
| 5,688,715 A | 11/1997 | Sexton et al. | |
| 5,716,495 A | 2/1998 | Butterbaugh et al. | |
| 5,760,368 A | 6/1998 | Nakata | |
| 5,811,019 A | 9/1998 | Nakayama et al. | |
| 5,814,156 A | 9/1998 | Elliott et al. | |
| 5,818,009 A * | 10/1998 | Nakata et al. | 219/121.84 |
| 5,860,202 A | 1/1999 | Okawa et al. | |
| 5,869,803 A | 2/1999 | Noguchi et al. | |
| 5,870,421 A | 2/1999 | Dahm | |
| 5,874,011 A | 2/1999 | Ehrlich | |
| 5,877,392 A | 3/1999 | Russell et al. | |
| 5,912,186 A | 6/1999 | Yoshino et al. | |
| 5,935,464 A | 8/1999 | Dulaney et al. | |
| 5,948,290 A | 9/1999 | Yamamoto et al. | |
| 5,986,234 A | 11/1999 | Matthews et al. | |
| 6,008,144 A | 12/1999 | Shih et al. | |
| 6,055,344 A * | 4/2000 | Fouquet et al. | 385/16 |
| 6,074,957 A | 6/2000 | Donahoe et al. | |
| 6,086,366 A | 7/2000 | Mueller et al. | |
| 6,136,096 A | 10/2000 | Morishige | |
| 6,144,010 A | 11/2000 | Tsunemi et al. | |
| 6,162,589 A | 12/2000 | Davis et al. | |
| 6,204,475 B1 | 3/2001 | Nakata et al. | |
| 6,238,269 B1 | 5/2001 | Pollard et al. | |
| 6,284,148 B1 | 9/2001 | Laermer et al. | |
| 6,310,701 B1 | 10/2001 | Lizotte | |
| 6,331,258 B1 | 12/2001 | Silverbrook | |
| 6,339,205 B1 | 1/2002 | Nakayama | |
| 6,376,797 B1 | 4/2002 | Piwczyk et al. | |
| 6,384,371 B1 | 5/2002 | Hinei et al. | |
| 6,400,389 B1 | 6/2002 | Shaffer et al. | |
| 6,423,928 B1 | 7/2002 | Piwczyk | |
| 6,425,804 B1 | 7/2002 | Pettit et al. | |
| 6,435,950 B1 | 8/2002 | Pettit et al. | |
| 6,448,534 B1 | 9/2002 | Kobsa | |
| 6,472,295 B1 | 10/2002 | Morris et al. | |
| 6,507,001 B1 * | 1/2003 | Kubby | 219/121.71 |
| 6,623,335 B2 | 9/2003 | Pettit et al. | |
| 6,623,338 B2 | 9/2003 | Pettit et al. | |
| 6,641,745 B2 | 11/2003 | Tan et al. | |
| 6,648,454 B1 | 11/2003 | Donaldson et al. | |
| 6,847,004 B2 * | 1/2005 | Das et al. | 219/121.71 |
| 2001/0040245 A1 | 11/2001 | Kawai | |
| 2001/0045419 A1 | 11/2001 | Dunsky et al. | |
| 2002/0017511 A1 | 2/2002 | Kling | |
| 2002/0017514 A1 | 2/2002 | Lambert | |
| 2002/0040894 A1 | 4/2002 | Borstel | |
| 2002/0086544 A1 | 7/2002 | Boyle | |
| 2002/0088780 A1 | 7/2002 | Boyle et al. | |
| 2002/0108938 A1 | 8/2002 | Patel | |
| 2002/0130116 A1 | 9/2002 | Lawson | |
| 2002/0170891 A1 | 11/2002 | Boyle et al. | |
| 2002/0191054 A1 | 12/2002 | Liu et al. | |
| 2003/0036004 A1 | 2/2003 | Takada et al. | |
| 2003/0062126 A1 | 4/2003 | Scaggs | |
| 2003/0117449 A1 * | 6/2003 | Cahill et al. | 347/7 |
| 2003/0140497 A1 | 7/2003 | Rivas et al. | |
| 2003/0155328 A1 | 8/2003 | Huth et al. | |
| 2004/0031151 A1 | 2/2004 | Buswell et al. | |
| 2004/0218017 A1 | 11/2004 | Kawamura et al. | |

FOREIGN PATENT DOCUMENTS

| | | |
|---|---|---|
| EP | 0737582 | 10/1996 |
| EP | 0796695 | 3/1997 |
| EP | 1106358 | 6/2001 |
| JP | 62-234687 | 10/1987 |
| JP | 63013334 | 1/1988 |
| JP | 05144978 | 6/1993 |
| JP | 05318744 | 12/1993 |
| JP | 06079486 | 3/1994 |
| JP | 08300667 | 11/1996 |
| JP | 09-254427 | 9/1997 |
| JP | 10163136 | 6/1998 |
| JP | 11008222 | 1/1999 |
| JP | 2000246475 | 9/2000 |
| WO | WO 98/20533 | 5/1998 |
| WO | WO 00/50198 | 8/2000 |
| WO | WO 01/03934 | 1/2001 |
| WO | WO 01/10177 | 2/2001 |
| WO | WO 01/47715 | 7/2001 |
| WO | WO 02/34455 | 5/2002 |
| WO | WO 02/47863 | 6/2002 |
| WO | WO 02/076666 | 10/2002 |
| WO | WO 03/028949 | 4/2003 |
| WO | WO 03/053627 | 7/2003 |
| WO | WO 03/070415 | 8/2003 |

OTHER PUBLICATIONS

J.H. Yoo et al., "Evidence for phase-explosion and generation of large particles during high power nanosecond laser ablation of silicon", Appl.Phys.Lett.(Feb. 7, 2000) pp. 783-785.

Daniel Mahoney, "Laser Cutting of Silicon for Fabrication of Solar Cells" http://www.unh.edu/materials-science/5_2_00.htm (May 2, 2000) (1 page).

J.H. Yoo et. al., "Explosive change in crater properties during high power nanosecond laser ablation of silicon" J.Appl.Phys. vol. 88, No. 3, (Aug. 1, 2000) pp. 1638-1649.

Henc-Bartolic et al., Silicon Surface Irradiated by Nitrogen Laser Radiation, FIZIKA A 6 (1997) 2, pp. 97-102.

Von Allmen et al., Laser-Beam Interactions with Materials, Physical Principles and Applications, 2d ed. (updated) 1995 pp. 131-134.

"Lens Selection, XP-00133847", Melles-Griot Catalog pp. 2.10-2.12.

Kobel(http://www.lambdphysik.com/News/press_story.asp:press_id=38),Gator Series DPSS Lasers Drill and Cut Silicon Wafers With Short Nanosecond Pulses (Feb. 23, 2001).

Kobel (http://www.lambdaphysik.com/News/press_story.asp:press_id=45),New PowerGator Industrial-Grade DPSS Laser—High Speed, High Quality, Micromachining . . . (May 15, 2001).

Kobel (http://www.lambdaphysik.com/News/press_story.asp:press_id=53),Lambda PhysikGator LaserSeriesReceivesAdvanced-Packaging—Wafer Dicing Award at Semicon West2001(Aug. 3, 2001).

Resonetics Laser Material Processing Solutions for Industry: http://www.resonetics.com/Industry.htm pp. 1-3.

Resonetics Illustrated Guide to Laser Applications in Micromachining-Polymers and Plastics, http://www.resonetics.com/applications.htm, pp. 1-2.

Resonetics Precision Flow and Laser Micro-machining-Engineer's Guide to Laser Micromachining-Precision Flow Devices, http://www.resonetics.com/precision.htm, pp. 1-5.

Resonetics Laser Micro-machining Technology-Technology Matching, http://www.resonetics.com/matching.htm, pp. 1-2.

Press Release "High-Quality Micro-Drilling and Cutting in Silicon Using Innovative Lasers" (Mar. 20, 2000) pp. 1-2.

* cited by examiner

METHOD OF FORMING SUBSTRATE FOR FLUID EJECTION DEVICE

CROSS-REFERENCE TO RELATED APPLICATIONS

This application is a Continuation-In-Part of U.S. patent application Ser. No. 10/076,467, filed on Feb. 15, 2002 now abandoned, assigned to the Assignee of the present invention, and incorporated herein by reference.

BACKGROUND

The market for electronic devices continually demands increased performance at decreased costs. In order to meet these requirements, the components which comprise various electronic devices must be made ever more efficiently and to closer tolerances.

Laser micromachining is a common production method for controlled, selective removal of material. However, existing laser micromachining technologies are hindered by several deficiencies, such as a lack of uniformity in the cut they produce, as well as variations in removal speed as the laser cuts deeper into a substrate. Other laser micromachining technologies have attempted to address these problems, but are impractical for production techniques.

Accordingly, the present invention arose out of a desire to provide fast, economical methods of laser micromachining various substrates.

SUMMARY

One aspect of the present invention provides a method of forming an opening through a substrate having a first side and a second side opposite the first side. The method includes laser machining a first portion of the opening into the substrate from the second side toward the first side, and abrasive machining a second portion of the opening into the substrate. Abrasive machining the second portion of the opening into the substrate includes completing the opening through the substrate.

BRIEF DESCRIPTION OF THE DRAWINGS

The same components are used throughout the drawings to reference like features and components.

DETAILED DESCRIPTION

Figure 1:
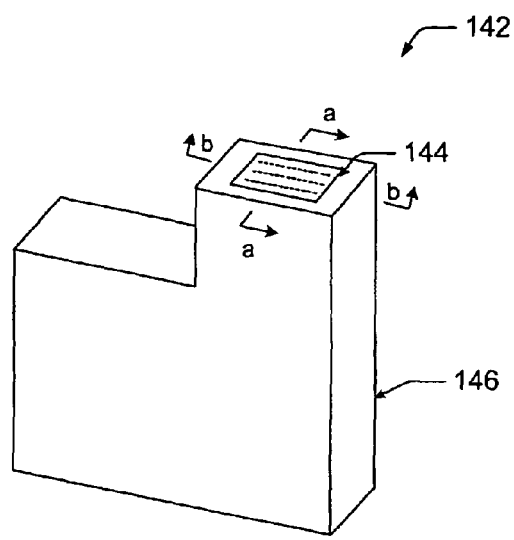
FIG. 1 shows a perspective view of a print cartridge in accordance with one exemplary embodiment.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The embodiments described below pertain to methods and systems for laser micromachining a substrate. Laser micromachining is a common production method for controlled, selective removal of material. In embodiments of the present invention, laser micromachining includes processes such as cutting, slotting, dicing, singulating, via drilling and 3-dimensional machining in a variety of substrate materials. This can include the machining of features either partially or completely through the substrate's thickness.

In one exemplary embodiment, the laser micromachining process utilizes a laser machine that can generate a laser beam for energizing and otherwise removing substrate material in an open, ambient environment. Energizing can comprise melting, vaporizing, exfoliating, phase explosion, and/or ablating among other processes. In some embodiments, the energizing can occur within an interface region surrounding the laser beam and the substrate material which the laser beam contacts. In further embodiments, the efficiency of the energizing process can be improved by supplying a halogen containing assist gas to the interface area. The assist gas can be provided by a gas supply nozzle that directs the assist gas to the interface area. In some embodiments, the assist gas can react with energized substrate material to form compounds that are more readily removed and/or dissipated than could otherwise be achieved. By supplying the assist gas to the interface region, the speed and efficiency of the laser machining process can be improved without the need to operate in controlled conditions. The exemplary laser machining apparatus works in an open air environment without the need for chambers or other containment vessels, and is therefore well suited for production techniques.

One exemplary embodiment of the laser machining process will be described in the context of forming slots in a substrate. Such slots can be used for, among other things, fluid feed slots. In one exemplary embodiment, a substrate containing fluid feed slots can be incorporated into a print head or other fluid ejecting device. As commonly used in print head dice, the substrate can comprise a semiconductor substrate that has microelectronics incorporated within and supported by the substrate. In one exemplary embodiment, the fluid feed slot(s) allow a fluid such as ink to be supplied to fluid ejecting elements contained in ejection chambers within the print head. The fluid ejection elements commonly comprise firing resistors that heat ink causing increased pressure in the ejection chamber. A portion of that ink can be ejected through a firing nozzle with the ink being replaced by ink from the ink feed slot.

Although exemplary embodiments included herein are described in the context of providing dice for use in ink jet printers, it is recognized and understood that the techniques described herein can be applicable to other applications where micromachining a substrate is desired. For example, the described embodiments can be used for quickly and efficiently dicing or singulating semiconductor wafers.

The various components described below may not be illustrated accurately as far as their size is concerned. Rather, the included figures are intended as diagrammatic representations to illustrate to the reader various inventive principles that are described herein.

Exemplary Products

FIG. 1 shows an exemplary print cartridge 142. The print cartridge is comprised of the print head 144 and the cartridge body 146. Other exemplary configurations will be recognized by those of skill in the art.

Figure 2:
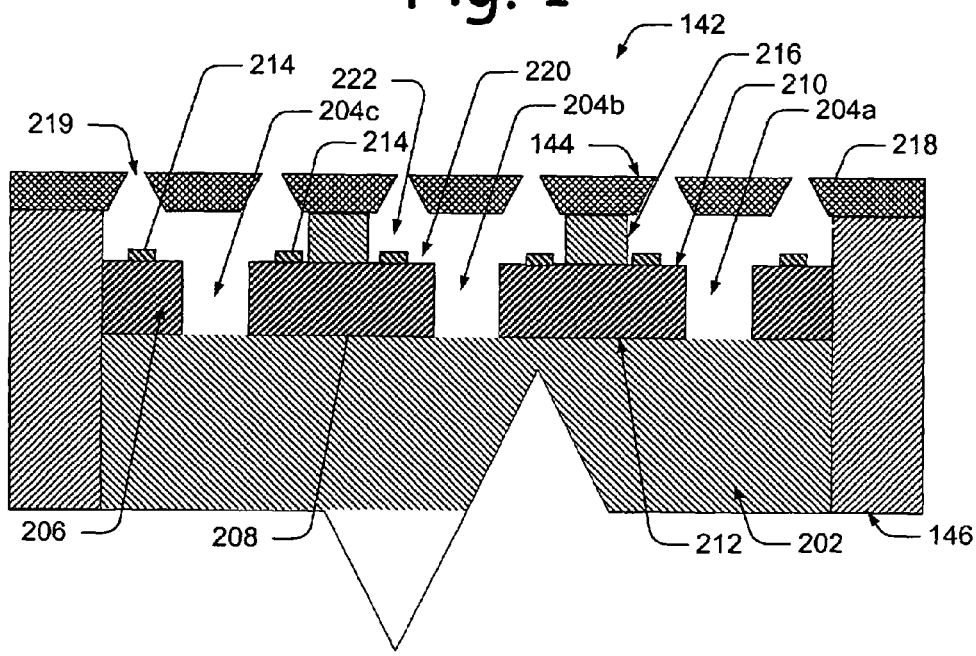
FIG. 2 shows a cross-sectional view of a portion of a print cartridge in accordance with one exemplary embodiment.

FIG. 2 shows a cross-sectional representation of a portion of the exemplary print cartridge 142 taken along line a-a in FIG. 1. It shows the cartridge body 146 containing ink 202 for supply to the print head 144. In this embodiment, the print cartridge is configured to supply one color of ink to the print head, though other exemplary configuration can supply multiple colors and/or black ink. A number of different ink feed slots are provided, with three exemplary slots being shown at 204a, 204b, and 204c. Other exemplary embodiments can utilize more or less ink feed slots. Some exemplary embodiments can divide the ink supply so that each of the three ink feed slots 204a-204c receives a separate ink supply.

The various ink feed slots pass through portions of a substrate 206. In some embodiments, silicon can be a suitable substrate. In some of these embodiments, the substrate 206 comprises a crystalline substrate such as single crystalline silicon or polycrystalline silicon. Examples of other suitable substrates include, among others, gallium arsenide, glass, silica, ceramics or a semi conducting material. The substrate can comprise various configurations as will be recognized by one of skill in the art. In this exemplary embodiment, the substrate comprises a base layer, shown here as silicon substrate 208.

The silicon substrate has a first surface 210 and a second surface 212. Positioned above the silicon substrate are the independently controllable ink energizing elements or firing elements that, in this embodiment, comprise firing resistors 214. In this exemplary embodiment, the resistors are part of a stack of thin film layers on top of the silicon substrate 208. The thin film layers can further comprise a barrier layer 216. In some embodiments, the barrier layer can comprise, among other things, a photo-resist polymer substrate. Above the barrier layer can be an orifice plate 218 that can comprise, but is not limited to a nickel substrate. In an additional embodiment, the barrier layer 216 and the orifice plate 218 are integral, formed of the same material.

In some embodiments, the orifice plate has a plurality of nozzles 219 through which ink heated by the various resistors can be ejected for printing on a print media (not shown). The various layers can be formed or deposited upon the preceding layers. The configuration given here is but one possible configuration.

The exemplary print cartridge shown in FIGS. 1 and 2 is upside down from the common orientation during usage. When positioned for use, ink can flow from the cartridge body 146 into one or more of the slots 204a-204c. From the slots, the ink can travel through an ink feed passageway 220 that leads to a firing chamber 222. In some embodiments, the firing chamber can be comprised of a firing resistor, a nozzle, and a given volume of space adjacent thereto. Other configurations are also possible. When an electrical current is passed through the resistor in a given firing chamber, the ink is heated and expands to eject a portion of the ink from the nozzle 219. The ejected ink can then be replaced by additional ink from the ink feed passageway 220.

Figure 3:
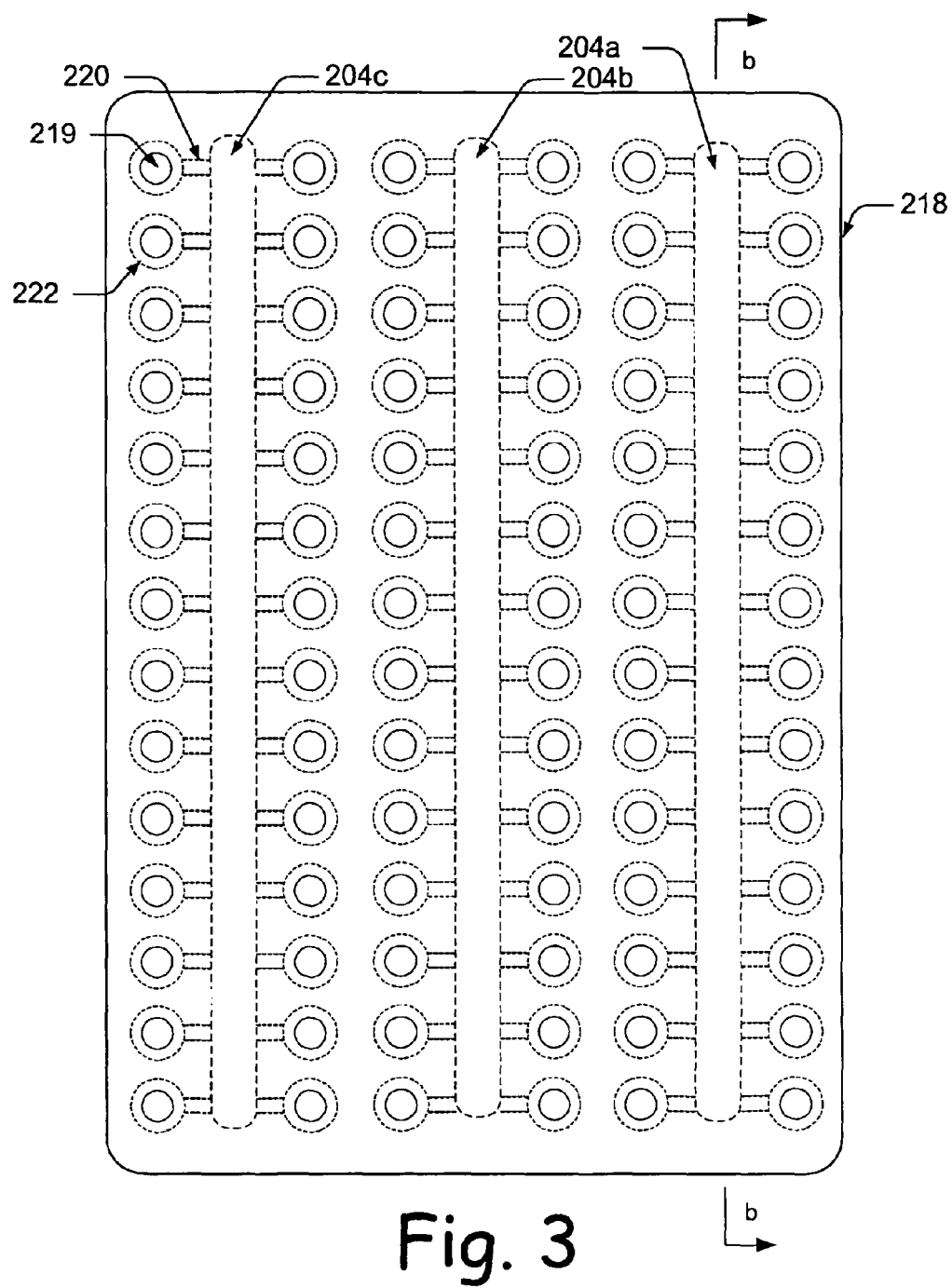
FIG. 3 shows a top view of a print head in accordance with one exemplary embodiment.

FIG. 3 shows an embodiment of a view from above the thin-film surface of a substrate incorporated into a print head. The substrate is covered by the orifice plate 218 with underlying structures of the print head indicated in dashed lines. The orifice plate is shown with numerous nozzles 219. Below each nozzle lies a firing chamber 222 that is connected to an ink feed passageway 220 and then to slot 204a-c. The slots are illustrated in this embodiment as an elliptical configuration when viewed from above the first surface of the substrate. Other exemplary geometries include rectangular among others.

Exemplary Systems

Figure 4:
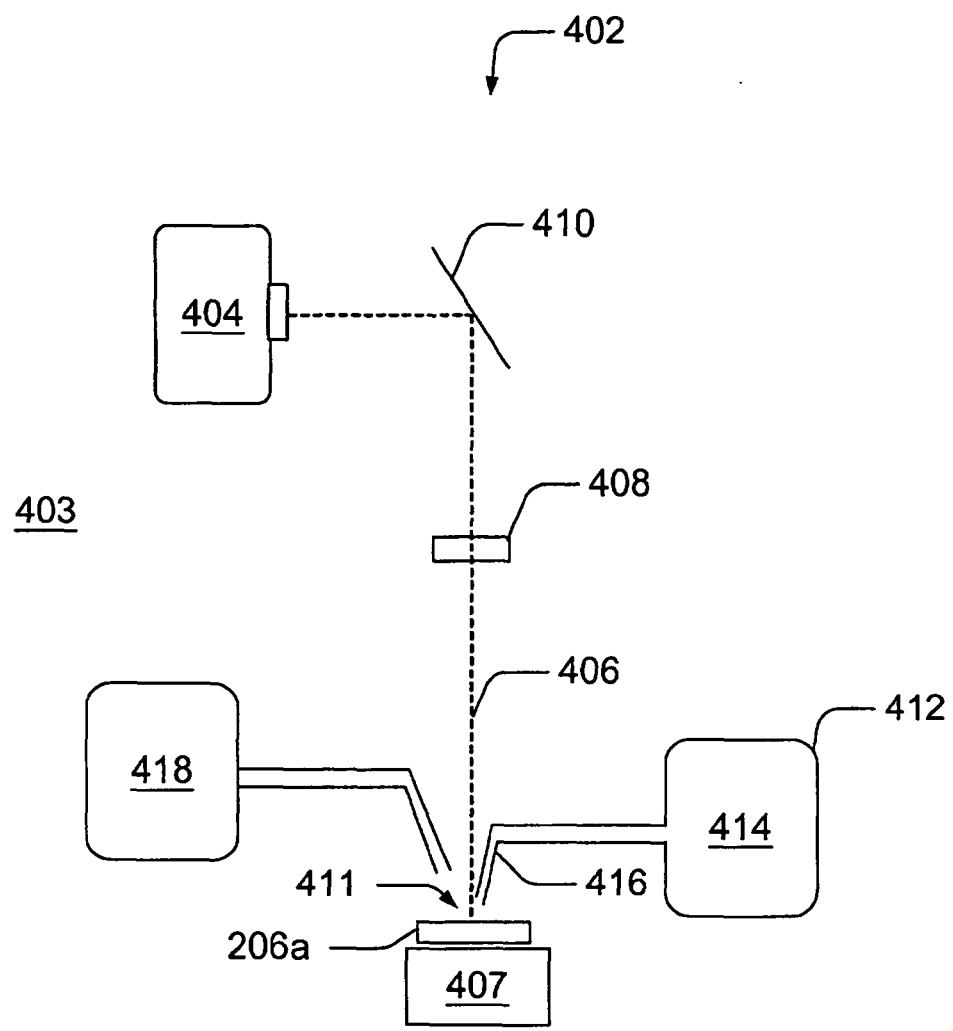
FIG. 4 shows a front elevational view of a laser machining apparatus in accordance with one exemplary embodiment.

FIG. 4 shows an exemplary apparatus or laser machine 402 capable of micromachining a substrate 206a in accordance with one exemplary embodiment. The laser machine can be configured for use in an open air environment or region 403. The laser machine can have a laser source 404 capable of emitting a laser beam 406. The laser beam can contact, or otherwise be directed at, the substrate 206a. In some exemplary embodiments, the substrate can be positioned on a fixture 407 in the open air environment.

Exemplary laser machines are commercially available. One such exemplary laser machine is the Xise 200 laser Machining Tool, manufactured by Xsil ltd. of Dublin, Ireland.

Exemplary laser machines can utilize various laser sources. A laser source has a crystal or other structure that when energized can emit the laser beam. An exemplary laser source is the Coherent AVIA 355-4500 which contains Crystalline Nd:YVO4 (also known as Vanadate). Other exemplary crystals include among others, Nd:YAG and Nd:YLF.

Each of these materials can produce a laser beam with a fundamental wavelength of about 1064 nanometers (nm) in one embodiment. Laser beams of various wavelengths can provide satisfactory embodiments. For example, some embodiments can have a wavelength in the range of less than about 550 nm.

In some exemplary embodiments, the wavelength of the laser beam can be modified within the laser source 404. For example, one embodiment can utilize the AVIA 355, where the frequency is tripled to yield a laser beam wavelength of 355 nm. Another exemplary embodiment can utilize a laser source with a wavelength of 532 nm. For example, the Lambda Physik PG532-15 can be utilized as a laser source that can provide a laser beam that has such a wavelength. Other exemplary embodiments can utilize laser beams having wavelengths ranging from less than 100 nm to more than 1500 nm. Other satisfactory embodiments can be achieved with laser beams having various properties as will be discussed in more detail below.

Various exemplary embodiments can utilize one or more lens (es) 408 to focus or expand the laser beam. In some of these exemplary embodiments, the laser beam can be focused in order to increase its energy density to more effectively machine the substrate. In these exemplary embodiments, the laser beam can be focused with one or more lenses 408 to achieve a desired diameter where the laser beam contacts the substrate 206a. In some of these embodiments, this diameter can range from about 1 micron to more than 100 microns. In one embodiment, the diameter is about 20 microns. Also, the laser beam can be pointed directly from the laser source 404 to the substrate 206a, or indirectly through the use of one or more mirror(s) 410.

Exemplary laser beams can provide sufficient energy to energize substrate material that the laser beam is directed at.

Energizing can comprise melting, vaporizing, exfoliating, phase explosion, and/or ablating among others processes. Some exemplary embodiments can energize substrate material equal to or above its material removal threshold. The material removal threshold is the energy density level necessary to remove substrate material by melting, vaporizing, exfoliating, and/or phase explosion. Energy density will be discussed in more detail below. The substrate that the laser beam is directed at and the surrounding region containing energized substrate material is referred to in this document as an interface region 411.

In some exemplary embodiments, the laser machine 402 can also have a gas supply 412 for supplying an assist gas 414 to the interface region 411. In some exemplary embodiments, the assist gas can be supplied via one or more gas supply nozzles 416.

Some exemplary embodiments can also utilize a debris extraction system 418 that can remove vaporized substrate materials and/or molecules formed from substrate material and a component of the assist gas, as well as various other molecules. In some embodiments, the debris extraction system can comprise a vacuum system and filtration system positioned to evacuate material in proximity to the laser beam and substrate. Exemplary debris extraction systems will be discussed in more detail below.

In some embodiments, the assist gas can increase the speed and/or efficiency at which the laser beam cuts or removes substrate material. Various mechanisms can contribute to the increased removal rate. For example, in some embodiments, molecules of the assist gas can be ionized by the laser beam energy. At least some of the resultant ions can react with energized substrate material. Such reactions can form resultant compounds that can be volatile and relatively non-reactive. These properties can allow the resultant compounds to diffuse or otherwise dissipate from the interface region and thus can decrease the incidence of redeposition of substrate material.

This is an advantage over other embodiments of laser machining techniques where a significant amount of the substrate material removed by the laser redeposits back on the substrate. Redeposited material adjacent to the interface region can result in undesired debris or component damage. Redeposited material in the interface region hinders the laser/substrate interaction and reduces the material removal rate.

Further, some embodiments of laser machining processes also lead to the formation of particulate debris typically having dimensions or diameters of 1 micron or less. In these embodiments, this debris can be formed from molten material directly released from the substrate's surface as well as from condensation of the vaporized substrate material. This particulate material or debris can cause scattering and absorption of laser light towards the end of the laser pulse, especially in laser pulses with a duration of longer than 5-10 nanoseconds (nsec), decreasing the amount of useful laser light reaching the target material surface, in this embodiment. Such particulate material can subsequently deposit on the area within or adjacent to the interface region.

Accordingly, these techniques result in redeposition which, in turn, decreases the speed of cutting or machining, as well as the quality of the finished machined substrate. Conversely, some embodiments of the invention described herein can greatly reduce or eliminate redeposition and can produce much cleaner, more uniform, cuts or machining as a result. In some exemplary embodiments, less than about 1.0 percent of removed material is redeposited. In a particular embodiment, less than about 0.5 percent of the removed material is redeposited.

Various mechanisms can contribute to this increased performance, including but not limited to, the following mechanisms. In some embodiments, the assist gas and/or disassociated components of the assist gas can interact with particulate debris generated by the action of the laser beam. This interaction can reduce the dimensions of the debris and allow the debris to be more easily removed by the extraction system. Another of the various mechanisms can increase performance by reacting the assist gas or its components with condensing material in a vapor plume of substrate material in the interface region to reduce the dimensions of any condensed material allowing it to be more easily removed by an extraction system.

Figures 5A, 5B:
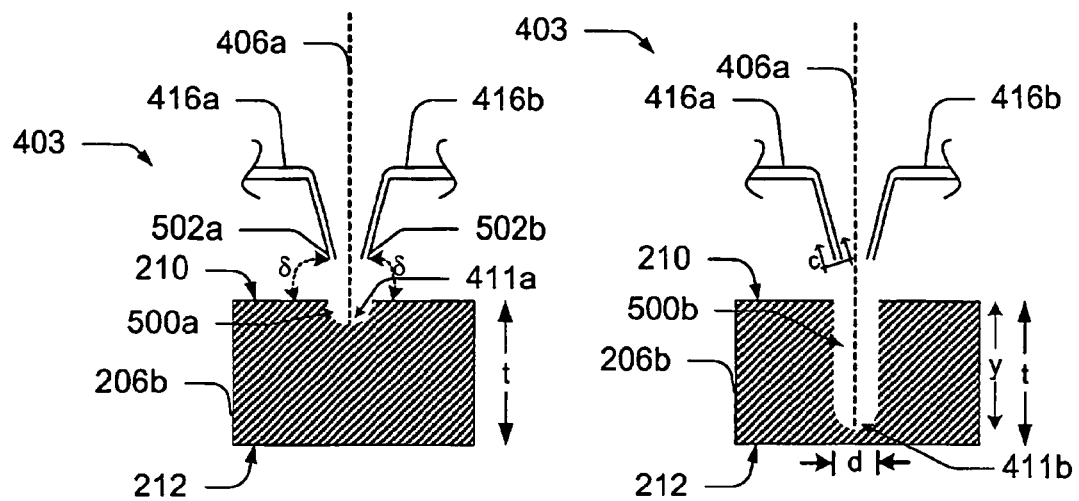
FIGS. 5a-5c show a cross-sectional view of a substrate in accordance with one exemplary embodiment.
Figure 5C:
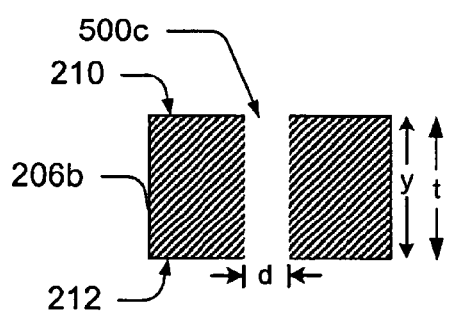

FIGS. 5a-5c show an exemplary embodiment of cross sections through a substrate 206b. Here, a feature is being micro-machined into the substrate. In this embodiment, the feature is a trench into the substrate that eventually is formed all the way through the substrate to form a via. Other exemplary features can also be formed as will be discussed below.

In the embodiments shown in FIG. 5a-5c, the substrate can have a thickness t defined by a first surface 210 and an opposite second surface 212. In further embodiments, the substrate's thickness can range from less than 100 microns to more than 2000 microns. In these exemplary embodiments, the thickness is about 675 microns.

Referring now to FIG. 5a, the laser beam 406a is shown directed at the substrate 206b. As shown here, the laser beam is orthogonal to the first surface 210 of the substrate, though other configurations can provide satisfactory embodiments. The laser beam has formed a shallow cut 500a in the substrate through the first surface 210. In this embodiment, two gas assist nozzles (416a and 416b) are shown positioned on opposite sides of the laser beam to supply the assist gas (not shown) to the interface area 411a. Though two gas assist nozzles are utilized here, other satisfactory embodiments can use more or less nozzles. The term 'nozzle' is used to describe the hardware that is used to deliver the assist gas to the interface region of the substrate. In various embodiments, this can include an exit aperture (502a and 502b). In some embodiments the exit aperture can be generally circular in transverse cross-section to plane c as shown in FIG. 5b.

In other exemplary embodiments, the exit aperture can comprise other configurations. For example, the exit aperture can be in a manifold configuration, an air knife configuration, and a ring shaped annulus configuration, among others.

In one exemplary embodiment, the exit aperture (502a and 502b) of the gas assist nozzles can be about 12 mm vertically above the first surface 210 and about 3.2 mm horizontally from the laser beam 406, though other satisfactory embodiments position the nozzles at different combinations of distances and angles. The nozzles can be positioned to eject the assist gas from the exit aperture at an angle δ of about 45 to about 90 degrees relative to the first surface of the substrate. In the exemplary embodiment shown in FIGS. 5a-5b, the angle δ is about 70 degrees.

The assist gas can be supplied at various delivery pressures and velocities. For example, in one embodiment, the gas supply nozzle's exit aperture can be a relatively small diameter to produce higher velocities for a given flow rate or the diameter can be relatively large to provide a lower velocity for a given flow rate. In one exemplary embodiment, the diameter is about 1.0 mm.

Exemplary embodiments can utilize various assist gases. In some embodiments, the assist gas can comprise a halide or a halogen containing gas. Exemplary assist gases can comprise, but are not limited to halocarbons and sulfur hexafluoride.

Many exemplary assist gases, including many of the halocarbon gases can have deleterious environmental consequences. Some exemplary embodiments can utilize a filtration system alone, or the filtration system can be used as a component of a debris extraction system 418 to remove or minimize any gases of environmental concern that could otherwise diffuse into the ambient environment from the interface area. This filtration system can include mechanisms for converting the assist gas and various by-product gases from the interface area into more inert compounds.

Other exemplary embodiments can utilize assist gases such as 1,1,1,2 tetrafluoroethane that can be effective assist gases and are understood to be relatively benign to the environment and thus can be advantageous. Other exemplary assist gases can also combine effectiveness in increasing laser machining performance and reduced environmental consequences. Although embodiments utilizing a single assist gas have been described in the exemplary embodiments, other embodiments can utilize multiple assist gases, the combination of which can provide beneficial characteristics.

In one exemplary embodiment the assist gas can comprise a halogen precursor, at least some of the molecules of which can be ionized or disassociated by laser energy in the interface area. In a further exemplary embodiment, the assist gas can dissociate or ionize in an extremely hot environment around the laser energized region and can react with energized substrate material to form, at least in part, one or more volatile compounds. This process can decrease the incidence of redeposition and/or are more easily removed by an extraction system.

In some embodiments, the assist gas can be supplied at a flow rate sufficient to be an excess reagent in the interface region. In one exemplary embodiment, where the assist gas comprises 1,1,1,2 tetrafluoroethane, the gas assist nozzles deliver the assist gas at a flow rate in a range of about 0.08 grams/second (gm/sec) to about 0.5 gm/sec. A further embodiment supplies about 0.33 gm/sec of 1,1,1,2 tetrafluoroethane. Other exemplary flow rates for various exemplary assist gases will be recognized by one of skill in the art.

FIG. 5b is an exemplary embodiment showing another cross section of the substrate where the laser has cut a trench 500b most of the way through the thickness of the substrate 206b. The depth of the trench is indicated as y and can be compared to the substrate's thickness t. In this exemplary embodiment, the assist gas can still be supplied to the interface region 411b to maintain efficient cutting despite the interface region being at least in part, at the bottom of the trench 500b. This can allow the laser to cut at generally the rate and efficiency as it did when the trench was shallower, for example as shown in FIG. 5a. This embodiment can also allow the laser to cut a trench of generally uniform diameter d for the entire depth of the trench.

FIG. 5c shows the trench 500c having been completed through the entire thickness t of the substrate. Thus, the depth y of the trench 500c equals the thickness t of the substrate 206b. Such a through hole, also known as a via, can be useful for many aspects of incorporating microelectronics onto a substrate among others. As shown here, the via has a generally consistent diameter d throughout. In these embodiments, the diameter can be less than about 60 microns, though larger diameters can be achieved.

Some embodiments can produce trenches and/or vias that have diameters less than or equal to about 30 microns. The efficiencies of these embodiments can allow these trenches or vias to have an aspect ratio (feature depth divided by the feature width) of at least about 10 with further embodiments having aspect ratios greater than 20. Thus, in the trench shown in FIG. 5b, the feature depth equals y and the feature width equals the diameter d. Referring again to FIG. 5c the depth of the via y equals the substrate's thickness t. So in this embodiment, the aspect ratio equals the substrate's thickness t divided by the diameter d. Although a via is shown here, these embodiments can also form other features, such as trenches, slots and/or cuts, as will be discussed in more detail in relation to FIGS. 6a-6b and 7a-7b.

The laser machining apparatus in some embodiments can cut into a specific point on the substrate and can form a trench of less than or about 30 microns through the same substrate without moving the laser or substrate. This not only allows smaller trenches to be made in the substrate, but the trench forming process can be made correspondingly faster and of better quality, while affecting less of the surrounding substrate material than can be achieved with other typical technologies.

Some embodiments of the present invention allow for the formation of trenches and vias having small diameters that are generally consistent for their entire depth. This is achieved, by among other things, maintaining the rate and efficiency of the removal process by reducing redeposition and particle build-up.

In other embodiments, where technologies attempt to use various gases to promote laser function, however, these systems typically require a controlled environment usually achieved through the use of a chamber into which the substrate is placed. In this embodiment, the conditions and constituent gases of the chamber are then altered before commencing laser machining. The constraints imposed by having to open and close and reseal the chamber and then reestablish the controlled environment whenever components are added or removed has prevented such processes from becoming commercially practicable. In contrast, some embodiments described herein, by virtue of the fact that they are configured for use in open air environments, are inherently well adapted to mass production applications such as assembly lines.

Figures 6A, 6B:
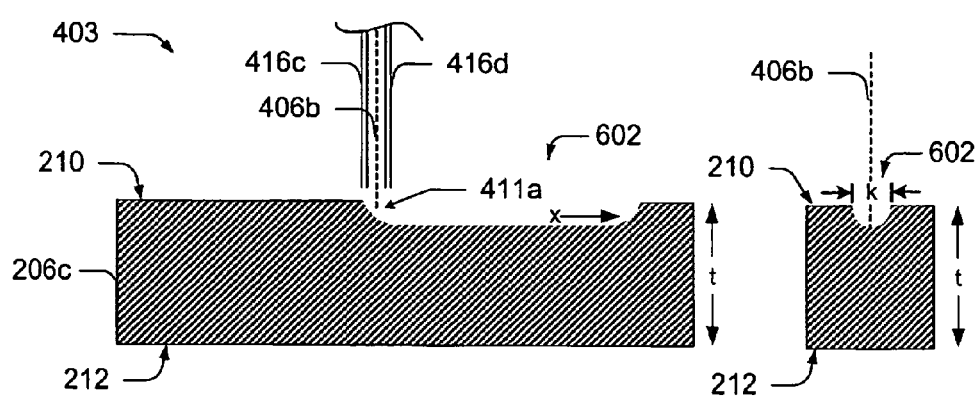
FIGS. 6a-6b show a cross-sectional view of a substrate in accordance with one exemplary embodiment.

FIGS. 6a-6b show a laser beam cutting or removing substrate material to form a trench 602. FIG. 6a is a view taken in cross section along the long axis of the trench, while FIG. 6b is a cross section taken transverse the long axis.

FIG. 6a shows a cross section along the length of a trench 602 formed from the laser beam contacting the substrate while the substrate was moved in the x direction relative to the laser beam. In another exemplary embodiment, the laser beam can be moved relative to the substrate in several ways. For example, the laser beam can be moved, in either or both the x and y directions, while the substrate remains stationary. The gas assist nozzles can be moved in conjunction with the laser beam or left stationary. Alternatively, the substrate can be moved and the laser beam kept stationary. For example, in one embodiment, the substrate 206c can be placed on a fixture 407 that in some embodiments has the capability to move the substrate relative to the laser beam. Other exemplary embodiments can utilize a combination of these techniques, among others, to move the substrate and the laser beam relative to one another.

FIG. 6a further shows two gas assist nozzles 416c and 416d adjacent and parallel to the laser beam 406b so that each of them is orthogonal to the substrate's first surface 210. This is one exemplary configuration that can supply assist gas to the interface area.

FIG. 6b shows an embodiment where the laser beam forms a kerf k in the substrate. The kerf is the width of the cut formed by the laser beam as it is moved relative to the substrate. The kerf width can be affected by several factors including the amount of redeposition of substrate material as well as the laser's parameters and speed at which the laser beam is moved in relation to the substrate.

In some exemplary embodiments, the laser parameters can establish a laser beam with a peak power density of greater than 1 GW/cm$^2$, with one exemplary embodiment having a peak power density of about 4.78 GW/cm$^2$. The laser machine, in various embodiments, can generate the laser in pulses in any suitable range of values. In some embodiments, pulse values range from about 1 kilohertz (kHz) to about 200 kHz. In one embodiment the pulse rate is about 20 kHz. Other satisfactory embodiments can use rates below and above the range given here. The laser beam pulse width can be about 1 to 100 nanoseconds, with one exemplary embodiment using about 15 nanoseconds.

The movement of the laser beam relative to the substrate per unit of time is referred to in this document as the laser scan rate. Exemplary embodiments can utilize a laser scan rate of about 1 to about 1000 millimeters/second (mm/sec). Some exemplary embodiments can utilize a laser scan rate of about 10 to about 300 mm/sec with other exemplary embodiments utilizing about 100 mm/sec. In one embodiment, these parameters can allow a laser to quickly make a cut having a consistent kerf width so that the resultant trench has a surface roughness less than existing technologies.

Maintaining a uniform kerf can result in a better quality trench, slot or other feature that is more uniform along its length and depth and closer to the desired dimensions. The described embodiments improve kerf uniformity, as well as allow for increased cutting speed.

The described embodiments can efficiently form high aspect ratio features while maintaining high cutting efficiency. In one embodiment, aspect ratios in the range of about 4.5 to about 11.25 can be achieved with the laser removing at least about 9,800,000 cubic microns of substrate material per joule of laser energy. In some embodiments, the features can be made with even higher aspect ratios with very little reduction in efficiency. This is in contrast to other embodiments of laser machining technology where efficiency deceases dramatically with increasing feature aspect ratio.

Figure 7A:
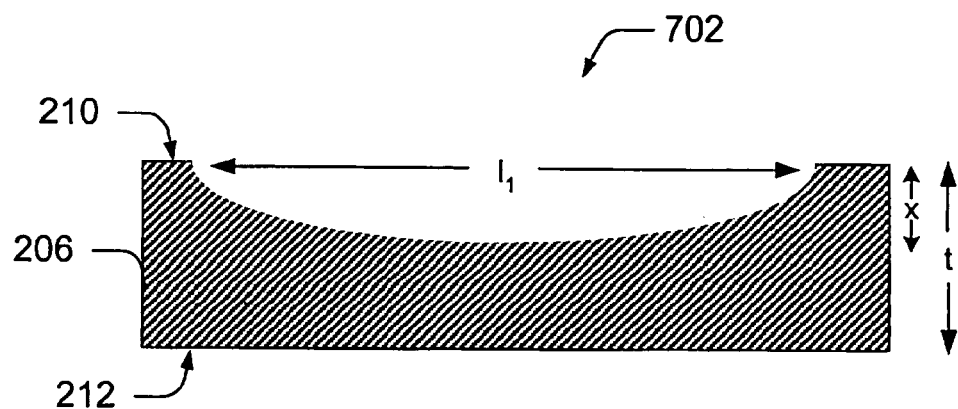
FIGS. 7a-7b show a cross-sectional view of a substrate in accordance with one exemplary embodiment.
Figure 7B:
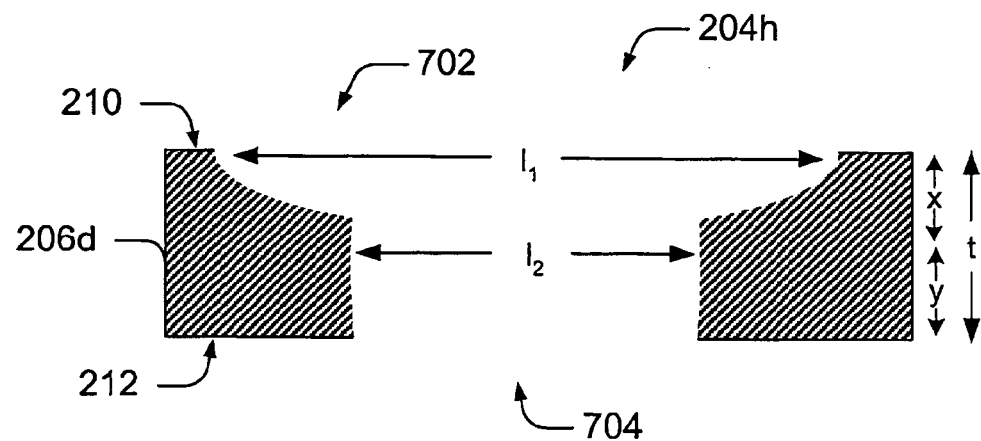

FIGS. 7a-7b show an embodiment where the laser has been used in combination with another removal technique to form a slot in the substrate. The slot can comprise a fluid feed slot, and in some embodiments can comprise a fluid feed slot in a substrate that can be incorporated into a fluid ejecting device.

Referring now to FIG. 7a, a laser cut has formed a trench 702 in the substrate 206d. In this embodiment, the trench has a depth x and a length $l_1$. In this example, the trench depth passes through less than the entire thickness t of the substrate. Other examples can be shallower or deeper than shown, or can pass all the way through the thickness of the substrate for at least a portion of its length to form a slot through the substrate.

In this embodiment, the trench can be formed from one or more passes of the laser beam over the substrate. As can be seen from this view along the long axis of the trench, the trench has a contoured configuration. Other configurations can include tapered and stepped configurations, among others.

FIG. 7b shows an embodiment of a cross section taken along the long axis of the substrate and showing a second trench 704 having a length $l_2$ where $l_2$ is less than $l_1$, formed through the second surface 212 to intercept at least portions of the first trench to form a through-slot 204h. The second trench can be formed utilizing various substrate removal techniques, including but not limited to: sand drilling, dry etching, wet etching, laser micromachining, and mechanical machining. If laser machining is used as the second removal technique, the laser beam can have the same properties as the laser beam used to make the first trench or feature, or the second laser beam can have different properties. For example, in one embodiment a first laser beam having a wavelength of about 1100 nm can be used to cut a first trench followed by a second laser beam having a wavelength of about 355 nm to remove additional material. Such an exemplary embodiment can take advantage of the various cutting properties of different wavelength lasers.

In the example given in FIG. 7a and 7b, the first trench or feature is formed first using the laser machining process followed by a subsequent removal process forming the second trench. Such need not be the case, for example in some embodiments, substrate material can be removed from a first side using sand drilling, among others. This process can then be followed by laser machining to remove additional substrate material. In these embodiments, the laser machining process can be conducted from the same side or surface as the sand drilling process or from an opposite second side.

Other exemplary embodiments can employ additional intermediary steps to achieve a desired feature. Some intermediary steps can apply or deposit material that is further configured by subsequent removal steps.

The various exemplary embodiments have so far been described in the context of cutting or forming trenches, vias and slots in a substrate. However, the exemplary embodiments can also be used wherever controlled, selective, removal of material is desired. This can include other processes such as cutting, dicing, singulating, and 3 dimensional machining in a variety of substrate materials. This can further include the micromachining of features either partially or completely through the substrate's thickness.

For example, in the semiconductor industry in recent years there has been a drive toward smaller and smaller devices for both size constraints of the product and for cost considerations. The more devices per semiconductor substrate or wafer, the lower the device cost. It is common for a semiconductor substrate to contain a plurality of devices, which require dicing or singulation before being packaged for assembly into an electronic device, such as a fluid ejecting device, ink-jet print head or some other device.

Traditionally in the industry, mechanical dicing saws have been used to singulate or dice these components. The existing technologies are restricted to straight line cuts in the substrate material, whereas the described laser micromachining embodiments can form features or cuts having complex shapes, straight, curved, non-continuous cuts, or any combination thereof.

The described embodiments can also accomplish this with kerf widths of 10 to 15 microns and lower. Conversely, mechanical dicing saws produce minimum kerf widths of 50 to 100 microns, depending on the substrate material and thickness. Smaller kerfs can result in more devices per wafer and therefore can lower device cost.

Further, mechanical dicing is a wet process that typically uses a cooling fluid for the cutting process. The described embodiments eliminate exposing the devices to potential damage from the cooling fluid, and also are very efficient with little or no redeposition of removed debris material. These and other features allow the described embodiments to better perform many micromachining tasks than existing technologies.

Exemplary Methods

Figure 8:
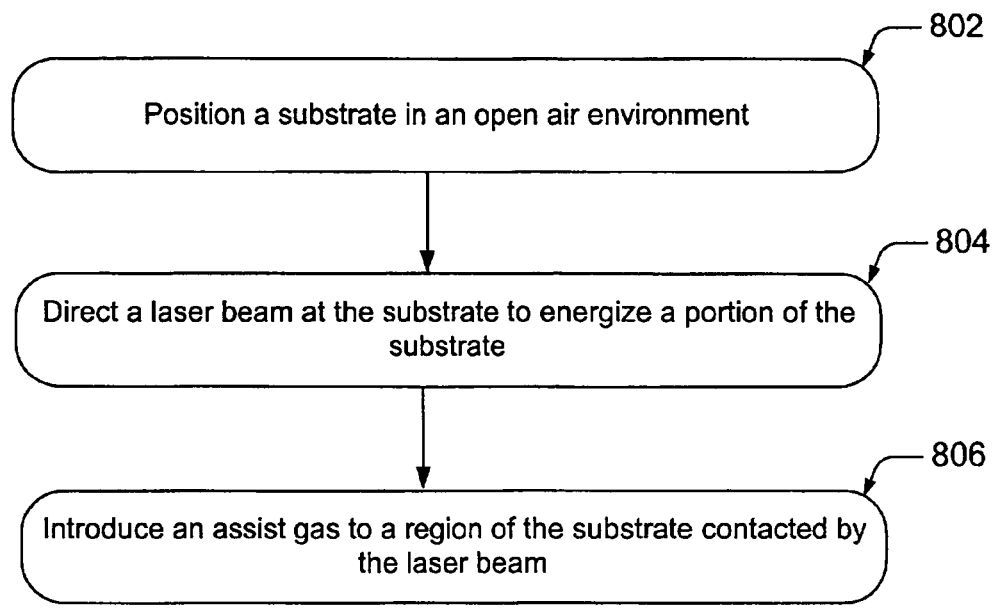
FIG. 8 shows a flow chart showing steps in accordance with one exemplary embodiment.

FIG. 8 is a flow chart that helps to illustrate the various exemplary methods described herein.

Step 802 positions a substrate in an open air environment. Various examples of exemplary substrates have been described above. In this embodiment, the substrate can be positioned on a fixture 407 or other suitable structure. Step 804 directs or projects a laser beam at the substrate to energize a portion of the substrate material. Such energizing can cut or remove substrate material in some embodiments. Various exemplary laser machines and laser beams have been described above.

Step 806 introduces or directs an assist gas to a region of the substrate contacted by the laser beam. In some exemplary embodiments the assist gas can be directed to the interface region. Some exemplary embodiments supply the assist gas via one or more gas assist nozzles of various configurations, exemplary embodiments of which are described above. Various assist gases can be directed to the interface area and can increase the performance of the laser beam in cutting substrate material.

FIGS. 9a-9d show an embodiment where laser machining has been used in combination with abrasive machining to form a slot or opening 910 in a substrate 920. The opening can comprise a fluid feed slot, and in some embodiments, can comprise a fluid feed slot in a substrate that can be incorporated into a fluid ejection device.

Figure 9A:
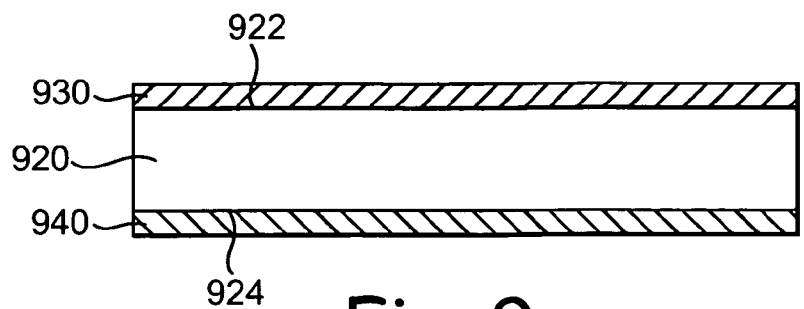
FIGS. 9a-9d show a cross-sectional view of a substrate in accordance with one exemplary embodiment.

In one embodiment, substrate 920 is a silicon substrate and opening 910 is formed in substrate 920 by laser machining and abrasive machining, as described below. As illustrated in the embodiment of FIG. 9a, substrate 920 has a first side 922 and a second side 924. Second side 924 is opposite first side 922 and, in one embodiment, oriented substantially parallel with first side 922. Opening 910 communicates with first side 922 and second side 924 of substrate 920 so as to provide a channel or passage through substrate 920. While only one opening 910 is illustrated as being formed in substrate 920, it is understood that any number of openings may be formed in substrate 920.

In one embodiment, first side 922 forms a front side of substrate 920 and second side 924 forms a back side of substrate 920 such that fluid flows through opening 910 and, therefore, substrate 920 from the back side to the front side. Accordingly, opening 910 provides a fluidic channel through substrate 920.

In one embodiment, as illustrated in FIG. 9a, before opening 910 is formed through substrate 920, thin-film layers or thin-film structure 930 is formed on substrate 920. More specifically, thin-film structure 930 is formed on first side 922 of substrate 920. Thin-film structure 930 includes ink energizing elements or firing resistors, as described above.

In one embodiment, thin-film structure 930 includes one or more passivation or insulation layers formed, for example, of silicon dioxide, silicon carbide, silicon nitride, tantalum, poly-silicon glass, or other material. In addition, thin-film structure 930 also includes a conductive layer which defines the firing resistors and corresponding conductive paths and leads. The conductive layer is formed, for example, of aluminum, gold, tantalum, tantalum-aluminum, or other metal or metal alloy.

Also, as illustrated in the embodiment of FIG. 9a, a mask layer 940 is provided on second side 924 of substrate 920. In one embodiment, mask layer 940 is directly formed on second side 924 of substrate 920. In another embodiment, mask layer 940 is laminated or attached to second side 924 of substrate 920.

In one embodiment, as described below, opening 910 in substrate 920 is formed in part by abrasive machining. Thus, mask layer 940 is formed of a material resistant to the abrasive machining. In one embodiment, for example, mask layer 940 is formed of a polymer material such as photoresist or a dry film photoresist. In one embodiment, mask layer 940 is formed of a photo-imageable polymer, such as SU8 available from MicroChem Corporation of Newton, Mass., VACREL available from DuPont of Willmington, Dela., or ORDYL from Tokyo Ohka Kogyo Company Ltd of Kawasaki, Japan.

Figure 9B:
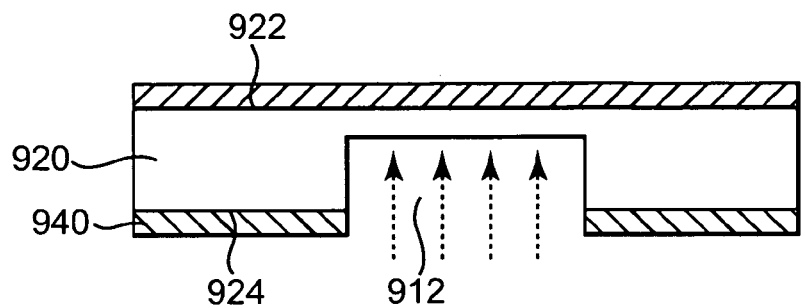

As illustrated in the embodiment of FIG. 9b, after mask layer 940 is provided on second side 924, a first portion 912 of opening 910 is formed in substrate 920. In one embodiment, first portion 912 is formed by a laser machining process. As such, first portion 912 of opening 910 is formed in substrate 920 by laser machining into substrate 920 from second side 924 toward first side 922.

In one embodiment, the laser machining process includes gas-assist laser machining. With gas-assist laser machining, a gas or aerosol of a gas such as HFC provides the local environment during laser machining, as described above. In other embodiments, the laser machining process includes water-assist laser machining and/or air-assist laser machining. With water-assist laser machining, water or other suitable liquid provides the local environment during laser machining, and with air-assist laser machining, the laser removes material from the substrate in an air atmosphere. In one embodiment, the laser machining process includes a two-step process including, for example, water-assist laser machining followed by air-assist laser machining.

In one embodiment, first portion 912 of opening 910 is formed without patterning of mask layer 940. More specifically, selective areas of mask layer 940 are not removed before laser machining to expose or reveal areas of substrate 920 which define where opening 910 (FIG. 9d) is to be formed in substrate 920. As such, in one embodiment, the laser machining process of forming first portion 912 of opening 910 includes laser machining into and through mask layer 940. Thus, mask layer 940 is patterned by the laser machining process of forming first portion 912 of opening 910. Accordingly, the need for separate processing steps to pattern mask layer 940 are avoided thereby resulting in fewer processing steps and simplifying process complexity.

Figure 9C:
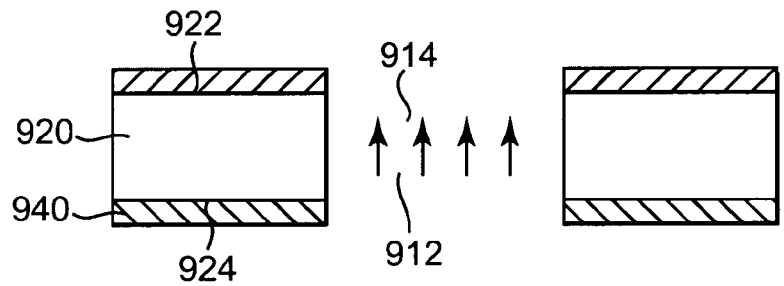

Next, as illustrated in the embodiment of FIG. 9c, a second portion 914 of opening 910 is formed in substrate 920. In one embodiment, second portion 914 is formed by an abrasive machining process. More specifically, second portion 914 is formed by abrasive machining exposed areas of substrate 920 through first portion 912 of opening 910 from second side 924 toward first side 922.

In one embodiment, the abrasive machining process includes directing a stream of compressed gas, such as air, and abrasive particulate material at substrate 920. As such, the stream of abrasive particulate material impinges on substrate 920 and abrades or erodes exposed areas of substrate 920 through mask layer 940. The abrasive particulate material may include, for example, sand, aluminum oxide, silicon carbide, quartz, diamond dust, or any other suitable abrasive material in particulate form or particulate material having suitable abrasive qualities for abrading substrate 920.

Figure 9D:
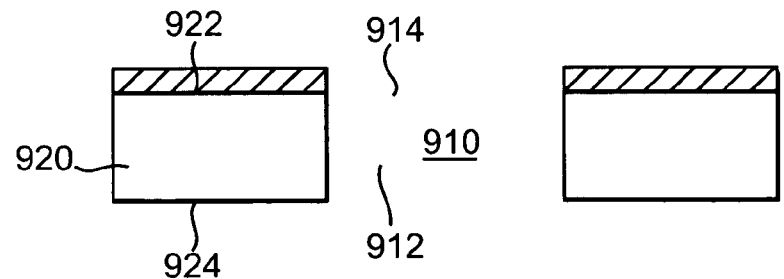

As illustrated in the embodiment of FIG. 9d, second portion 914 of opening 910 is formed through substrate 920 to first side 922. After opening 910, including, more specifically, first portion 912 and second portion 914 of opening 910 are formed, mask layer 940 is stripped or removed from second side 924 of substrate 920.

FIGS. 10a-10d show an embodiment where laser machining has been used in combination with abrasive machining to form a slot or opening 1010 in a substrate 1020. The opening can comprise a fluid feed slot, and in some embodiments, can comprise a fluid feed slot in a substrate that can be incorporated into a fluid ejection device.

Figure 10A:
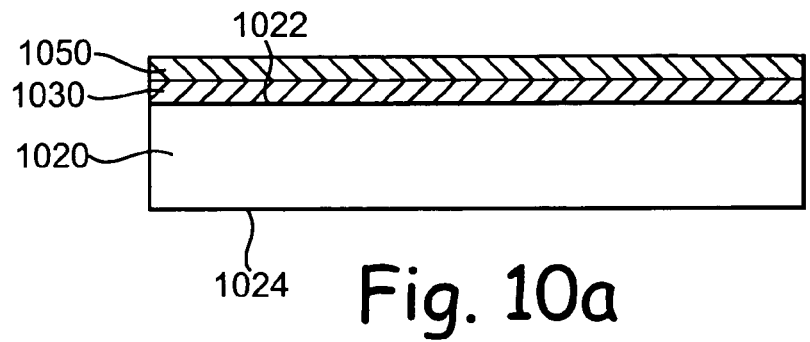
FIGS. 10a-10d show a cross-sectional view of a substrate in accordance with one exemplary embodiment.

In one embodiment, substrate 1020 is a silicon substrate and opening 1010 is formed in substrate 1020 by laser machining and abrasive machining, as described below. As illustrated in the embodiment of FIG. 10*a*, substrate 1010 has a first side 1022 and a second side 1024. Second side 1024 is opposite of first side 1022 and, in one embodiment, oriented substantially parallel with first side 1022. Opening 1010 communicates with first side 1022 and second side 1024 of substrate 1020 so as to provide a channel or passage through substrate 1020. While only one opening 1010 is illustrated as being formed in substrate 1020, it is understood that any number of openings 1020 may be formed in substrate 1020.

In one embodiment, first side 1022 forms a front side of substrate 1020 and second side 1024 forms a back side of substrate 1020 such that fluid flows through opening 1010 and, therefore, substrate 1020 from the back side to the front side. Accordingly, opening 1010 provides a fluidic channel through substrate 1020.

In one embodiment, as illustrated in FIG. 10*a*, before opening 1010 is formed through substrate 1020, thin-film layers or thin-film structure 1030 is formed on substrate 1020. More specifically, thin-film structure 1030 is formed on first side 1022 of substrate 1020. Thin-film structure 1030 includes ink energizing elements or firing resistors, as described above.

In one embodiment, thin-film structure 1030 includes one or more passivation or insulation layers formed, for example, of silicon dioxide, silicon carbide, silicon nitride, tantalum, poly-silicon glass, or other material. In addition, thin-film structure 1030 also includes a conductive layer which defines the firing resistors and corresponding conductive paths and leads. The conductive layer is formed, for example, of aluminum, gold, tantalum, tantalum-aluminum, or other metal or metal alloy.

Also, as illustrated in the embodiment of FIG. 10*a*, a mask layer 1050 is provided over thin-film structure 1030 on first side 1022 of substrate 1020. In one embodiment, as described below, opening 1010 in substrate 1020 is formed in part by abrasive machining. Thus, mask layer 1050 is formed of a material resistant to the abrasive machining. In one embodiment, for example, the material of mask layer 1050 includes photoresist.

In one embodiment, mask layer 1050 is formed by deposition, spray coating or lamination and patterned by photolithography and etching to define exposed portions of first side 1022 including, more specifically, exposed portions of thin-film structure 1030 as formed on first side 1022. As such, mask layer 1050 is patterned to outline and define where a portion of opening 1010 (FIG. 10*d*) is to be formed in substrate 1020 from first side 1022, as described below.

Figure 10B:
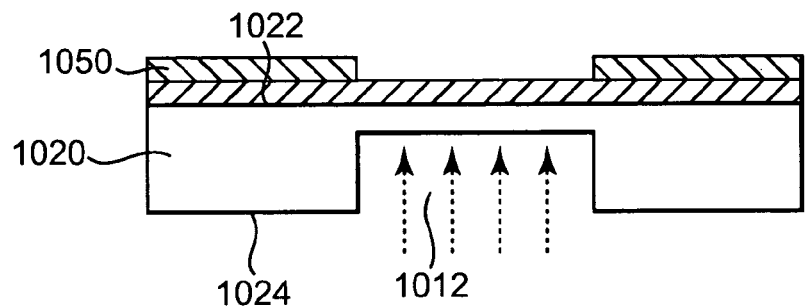

As illustrated in the embodiment of FIG. 10*b*, a first portion 1012 of opening 1010 is formed in substrate 1020. In one embodiment, first portion 1012 is formed by a laser machining process. As such, first portion 1012 of opening 1010 is formed in substrate 1020 by laser machining into substrate 1020 from second side 1024 toward first side 1022.

In one embodiment, the laser machining process includes gas-assist laser machining, as described above. In other embodiments, the laser machining process includes water-assist laser machining and/or air-assist laser machining, also as described above.

Figure 10C:
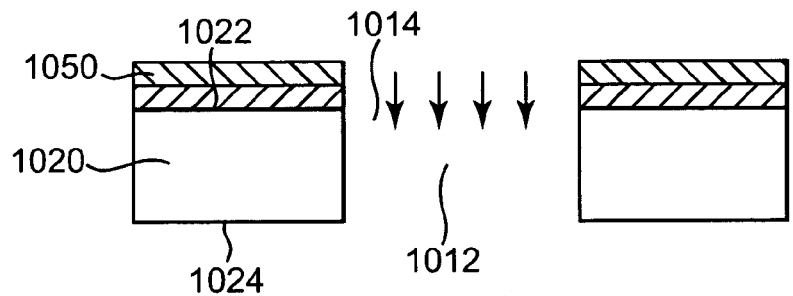

Next, as illustrated in the embodiment of FIG. 10*c*, a second portion 1014 of opening 1010 is formed in substrate 1020. In one embodiment, as described above, mask layer 1050 is patterned (FIG. 10*b*) to outline where second portion 1014 of opening 1010 is to be formed in substrate 1020 from first side 1022.

In one embodiment, second portion 1014 of opening 1010 is formed by an abrasive machining process. More specifically, second portion 1014 is formed by abrasive machining exposed areas of substrate 1020 as defined by mask layer 1050 from first side 1022 toward second side 1024. In one embodiment, the abrasive machining process includes directing a stream of compressed gas, such as air, and abrasive particulate material at substrate 1020, as described above.

Figure 10D:
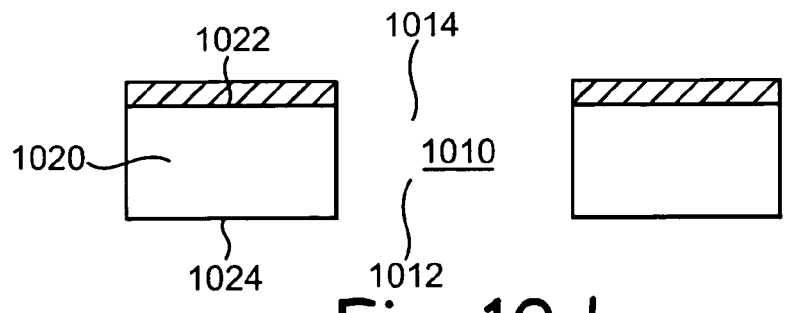

As illustrated in the embodiment of FIG. 10*d*, second portion 1014 of opening 1010 is formed in substrate 1020 so as to communicate with first portion 1012 of opening 1010. After opening 1010, including, more specifically, first portion 1012 and second portion 1014 of opening 1010, are formed, mask layer 1050 is stripped or removed from first side 1022 of substrate 1020.

In one embodiment, as illustrated in FIGS. 9*d* and 10*d*, first portions 912 and 1012 and second portions 914 and 1014 of respective openings 910 and 1010 include substantially linear sidewalls. As such, the processes for forming openings 910 and 1010, as illustrated and described above, allow for closer slot-to-slot pitch or spacing of adjacent openings as well as high aspect ratio trenches or slots with very low taper. Accordingly, the closer slot-to-slot pitch or spacing enables the use of overall smaller substrates. In addition, the processes for forming openings 910 and 1010, as illustrated and described above, allow for improved dimensional control and precision of opening or slot placement as compared with conventional slot-forming techniques.

In one embodiment, the laser machining processes for forming first portions 912 and 1012 of respective openings 910 and 1010, as described above, may generate debris and/or re-deposited material within the partially formed openings 910 and 1010. The abrasive machining processes of forming second portions 914 and 1014, however, in addition to further forming respective openings 910 and 1010, also removes the generated debris and/or re-deposited material. The abrasive machining processes, therefore, also provide a finishing step in forming openings 910 and 1010.

Conclusion

The described embodiments can utilize a laser beam to cut or micromachine substrates in an open air environment. In several embodiments, the laser beam cuts with greater efficiency and speed by supplying an assist gas to the interface area where the laser beam energizes substrate material. In particular, the laser beam, when supplied with assist gas, can form cuts with higher aspect ratios than existing technologies. Additionally, the cuts can be maintained closer to desired parameters and can have less variation in their dimensions, in some embodiments. Some of the described embodiments can form narrower cuts than present and past technology and the speed and efficiency of those cuts can be maintained through the depth of the cut, while forming a higher quality product than existing technologies. All of this can be achieved utilizing systems and methods that are conducive to production techniques.

While the above description refers to the inclusion of the thusly formed substrates in an ink jet print head, it is understood that the substrates may be incorporated into other fluid ejection systems including non-printing applications or systems, as well as other applications having fluidic channels through a substrate, such as medical devices or other micro electromechanical systems (MEMS devices). Accordingly, the methods, structures, and systems described herein are not limited to ink jet print heads, and are applicable to any slotted substrates. In addition, while the above description refers to routing fluid or ink through the slots or openings of the substrates, it is understood that any flowable material, including a liquid such as water, ink, blood, or photoresist, or flowable particles of a solid such as talcum powder or a powdered drug, or air may be fed or routed through the openings of the substrates.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of forming an opening through a substrate having a first side and a second side opposite the first side, the method comprising:
    laser machining a first portion of the opening into the substrate from the second side toward the first side; and
    after laser machining the first portion of the opening into the substrate, abrasive machining a second portion of the opening into the substrate, including completing the opening through the substrate.

2. The method of claim 1, wherein abrasive machining the second portion of the opening includes abrasive machining the second portion of the opening into the substrate from the second side toward the first side.

3. The method of claim 2, wherein abrasive machining the second portion of the opening includes abrasive machining the second portion of the opening through the first portion of the opening.

4. The method of claim 1, wherein abrasive machining the second portion of the opening includes abrasive machining the second portion of the opening into the substrate from the first side toward the second side.

5. The method of claim 4, wherein abrasive machining the second portion of the opening includes abrasive machining the second portion of the opening into the substrate from the first side to the first portion of the opening.

6. The method of claim 1, further comprising:
    before laser machining the first portion of the opening, providing a mask layer on the second side of the substrate.

7. The method of claim 6, further comprising:
    without patterning the mask layer, laser machining into the mask layer before laser machining the first portion of the opening.

8. The method of claim 7, wherein laser machining into the mask layer includes patterning the mask layer.

9. The method of claim 1, further comprising:
    before abrasive machining the second portion of the opening, providing a mask layer on the first side of the substrate.

10. The method of claim 9, further comprising:
    before abrasive machining the second portion of the opening, patterning the mask layer.

11. The method of claim 1, wherein laser machining the first portion of the opening comprises gas-assist laser machining.

12. The method of claim 1, wherein laser machining the first portion of the opening comprises water-assist laser machining.

13. The method of claim 1, wherein laser machining the first portion of the opening comprises air-assist laser machining.

14. The method of claim 1, wherein laser machining the first portion of the opening comprises water-assist laser machining and air-assist laser machining.

15. The method of claim 1, wherein abrasive machining the second portion of the opening comprises sand drilling.

16. A method of forming a substrate for a fluid ejection device, the substrate having a first side and a second side opposite the first side, the method comprising:
    laser machining into the substrate from the second side toward the first side, including partially forming a fluidic channel in the substrate; and
    after laser machining into the substrate, abrasive machining into the substrate, including completely forming the fluidic channel through the substrate.

17. The method of claim 16, wherein abrasive machining into the substrate includes abrasive machining into the substrate from the second side toward the first side.

18. The method of claim 16, wherein abrasive machining into the substrate includes abrasive machining into the substrate from the first side toward the second side.

19. The method of claim 16, further comprising:
    before laser machining into the substrate, providing a mask layer on the second side of the substrate.

20. The method of claim 19, wherein laser machining into the substrate includes laser machining into the mask layer.

21. The method of claim 20, wherein laser machining into the mask layer includes patterning the mask layer and revealing portions of the substrate.

22. The method of claim 16, wherein the substrate includes a thin-film structure on the first side.

23. The method of claim 22, further comprising:
    before abrasive machining into the substrate, providing a mask layer over the thin-film structure.

24. The method of claim 23, further comprising:
    before abrasive machining into the substrate, patterning the mask layer and revealing portions of the thin-film structure.

25. The method of claim 16, wherein laser machining into the substrate comprises at least one of gas-assist laser machining, water-assist laser machining, and air-assist laser machining.

26. The method of claim 16, wherein abrasive machining into the substrate comprises sand drilling.

27. A method of machining a substrate for a fluid ejection device, the substrate having a first side and a second side opposite the first side, and including a thin-film structure on the first side, the method comprising:
    providing a mask layer on the second side of the substrate;
    without patterning the mask layer, laser machining through the mask layer and into the substrate from the second side toward the first side; and
    after laser machining into the substrate, abrasive machining into the substrate from the second side toward the first side,
    wherein laser machining into the substrate and abrasive machining into the substrate includes forming an opening through the substrate between the first side and the second side.

28. The method of claim 27, wherein laser machining into the substrate includes partially forming the opening through the substrate, and wherein abrasive machining into the substrate includes further forming the opening through the substrate.

29. The method of claim 27, wherein the mask layer includes a polymer material.

30. The method of claim 27, wherein laser machining into the substrate comprises at least one of gas-assist laser machining, water-assist laser machining, and air-assist laser machining.

31. The method of claim 27, wherein abrasive machining into the substrate comprises sand drilling.

32. A method of machining a substrate for a fluid ejection device, the substrate having a first side and a second side opposite the first side, and including a thin-film structure on the first side, the method comprising:
- providing a patterned mask layer over the thin-film structure;
- laser machining into the substrate from the second side toward the first side; and
- after laser machining into the substrate, abrasive machining through the patterned mask layer and into the substrate from the first side toward the second side,
- wherein laser machining into the substrate and abrasive machining into the substrate includes forming an opening through the substrate between the first side and the second side.

33. The method of claim 32, wherein laser machining into the substrate includes partially forming the opening through the substrate, and wherein abrasive machining into the substrate includes further forming the opening through the substrate.

34. The method of claim 32, wherein laser machining into the substrate comprises at least one of gas-assist laser machining, water-assist laser machining, and air-assist laser machining.

35. The method of claim 32, wherein abrasive machining into the substrate comprises sand drilling.

* * * * *